(12) United States Patent
Fainberg (10) Patent No.: US 12,081,519 B2
(45) Date of Patent: Sep. 3, 2024

(54) CENTRALIZED NETWORK RESPONSE TO MITIGATE A DATA-BASED SECURITY RISK

(71) Applicant: FORESCOUT TECHNOLOGIES, INC., San Jose, CA (US)

(72) Inventor: Eli Fainberg, Tel Aviv (IL)

(73) Assignee: FORESCOUT TECHNOLOGIES, INC., San Jose, CA (US)

( * ) Notice: Subject to any disclaimer, the term of this patent is extended or adjusted under 35 U.S.C. 154(b) by 323 days.

(21) Appl. No.: 17/561,326

(22) Filed: Dec. 23, 2021

(65) Prior Publication Data

US 2023/0208848 A1 Jun. 29, 2023

(51) Int. Cl.
*H04L 9/40* (2022.01)
(52) U.S. Cl.
CPC ........ *H04L 63/0218* (2013.01); *H04L 63/101* (2013.01); *H04L 63/105* (2013.01); *H04L 63/1433* (2013.01)
(58) Field of Classification Search
CPC . H04L 63/0218; H04L 63/101; H04L 63/105; H04L 63/1433; H04L 63/20; G06F 2221/034; G06F 21/577
See application file for complete search history.

(56) References Cited

U.S. PATENT DOCUMENTS

| 9,805,204 | B1 | 10/2017 | Nanchenberg |
| 10,469,517 | B1* | 11/2019 | Higbee ............... H04L 63/1433 |
| 2009/0249482 | A1 | 10/2009 | Sarathy |
| 2018/0176254 | A1 | 6/2018 | Lam et al. |
| 2018/0351987 | A1* | 12/2018 | Patel ..................... G06F 21/577 |
| 2020/0082081 | A1* | 3/2020 | Sarin ..................... H04W 12/08 |
| 2020/0322369 | A1* | 10/2020 | Raghuramu .......... H04L 63/102 |
| 2021/0392171 | A1* | 12/2021 | Srinivas ................ G06N 5/047 |

FOREIGN PATENT DOCUMENTS

WO  2020005504 A1  1/2020

OTHER PUBLICATIONS

The International Search Report and Written Opinion for PCT Application No. PCT/US2022/052023 mailed Mar. 15, 2023.

* cited by examiner

*Primary Examiner* — Robert B Leung
(74) *Attorney, Agent, or Firm* — Womble Bond Dickinson (US) LLP (57) ABSTRACT

Systems, methods, and related technologies for identifying and reducing security risks on a network are described. Data that is held on each of one or more devices that are connected to a network is determined. A security risk of each of the one or more devices is determined based at least on the data. In response to the security risk of one of the one or more devices satisfying a threshold, the network is segmented such that the one of the one or more devices is placed on a less accessible segment of the network which reduces the security risk of the one of the one or more devices.

20 Claims, 6 Drawing Sheets

CENTRALIZED NETWORK RESPONSE TO MITIGATE A DATA-BASED SECURITY RISK

TECHNICAL FIELD

Aspects and implementations of the present disclosure relate to network monitoring, and more specifically, to a centralized network response to mitigate a data-based security risk.

BACKGROUND

A computer network can include computing devices that communicate with each over a computer network. The computing devices can be communicatively coupled to each other over physically wired, optical, or wireless radio-frequency technology. A computer network can have a variety of network topologies. As technology advances, the number and variety of devices that communicate over computer networks are rapidly increasing. Computer networks may be analyzed and security risks may be mitigated.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Aspects and implementations of the present disclosure are directed to determining security risk of devices on a network. The systems and methods disclosed can be employed with respect to network security, among other fields.

Network segmentation divides a network into multiple segments or subnets, each acting as its own small network. This allows network administrators to control the flow of traffic between subnets based on granular policies. Organizations may use segmentation to improve monitoring, boost performance, localize technical issues, and enhance security.

Network segmentation can be implemented as either physical or logical segmentation. With physical segmentation a larger network may be divided into a collection of smaller subnets. A physical or virtual firewall acts as the subnet gateway, controlling which traffic comes in and goes out. With physical segmentation the topology of the network is fixed depending on how the devices are physically connected through wiring and switches, etc.

With logical segmentation, subnets may be created through virtual local area networks (VLANs) or network addressing schemes. VLAN-based approaches use VLAN tags to automatically route traffic to a given subnet. Network addressing schemes use the network addresses and rules to divide the network and route the data according to those divisions. Logical segmentation provides improved flexibility over physical segmentation because logical segmentation may be performed (e.g., or changed) without wiring or movement of physical component.

Some network users have begun to adopt a "Zero Trust" strategy. Zero Trust assumes, by default, that no device or user within a network is trustworthy, including those devices and users already inside the network perimeter. Zero Trust works on the principle of a "protect surface" which defines the assets (e.g., data) that are deemed to be valuable or sensitive to a user in a network.

Under existing solutions, a network may be segmented by an IT professional, in response to an attack. Such a retroactive approach may be ineffective, given that the system may be open to new types of attacks, and inefficient, given that it may require the IT professional to manually reconfigure hardware to modify the network architecture.

Further, under existing solutions, some devices may be designated for critical data, and these devices may reside in a protected network. A network architect may configure a network with physical or logical segmentation to isolate data with device criticality. Such an approach, however, lacks flexibility because devices that are dedicated for critical data may go underutilized. Further, an organization may have many networks (e.g., subnets, network at different locations, etc.) that each have many devices talking over it. Different devices may have different types of data on it and that data may change over time. Thus, a device that may not initially have critical data, may later hold critical data. As such, the critical data may be vulnerable if not on a protected network. Further, different devices may have different hardware and software which may also change over time. As such, existing solutions may not adapt to the dynamic nature of a network.

Further, under existing solutions, data loss protection (DLP) software may be installed on devices. DLP detects potential data transmissions of sensitive data and prevents these transmissions by blocking the transmission of data at the device. Such an approach, however, may be cumbersome, requiring each device to host a DLP agent. Further, such an approach may be overreaching, putting too much restriction on a given device, without having a holistic understanding of the network (and how vulnerable that network is) that the device is on. Further, some devices (e.g., internet of things (IoT) devices) may not be capable of running such DLP software.

Accordingly, systems, methods, techniques, and related technologies are described herein in various implementations that includes a network monitor entity that may scan a network to determine whether devices on the network hold sensitive data, and assess a security risk of each device. A security risk of a device may be determined based on a combination of the sensitivity of data on a given device and how vulnerable that device is to an attack. The vulnerability of a device may further be determined based on a combination of factors. For example, the accessibility of the network, ports that are open on the device, applications (e.g., malicious applications, vulnerable applications, etc.) or services that are running on the device, monitoring software (e.g., anti-virus software) on a device, an operating system, and other factors, may influence how a vulnerable a given device is, which then influences how much of a security risk the device poses to an organization. If the security risk satisfies a threshold (e.g., a value, for instance a score, associated with the security risk, is greater than the threshold), the network monitor entity can perform network segmentation to isolate or reduce access to the perceived security risk. The monitor entity may repeatedly scan the network and assess the security risk of devices on the network over a period of time, thereby adjusting dynamically for changes in software, hardware, data, network configuration, or other changes of the devices on the network in a centralized manner.

It can be appreciated that the described technologies are directed to and address specific technical challenges and longstanding deficiencies in multiple technical areas, including but not limited to network security, monitoring, and policy enforcement. It can be further appreciated that the described technologies provide specific, technical solutions to the referenced technical challenges and unmet needs in the referenced technical fields.

Network segmentation can be used to enforce security policies on a network, for instance in large and medium organizations, by restricting portions or areas of a network which a device can access or communicate with. Segmentation or "zoning" can provide effective controls to limit movement across the network (e.g., by a hacker or malicious software). Enforcement points including firewalls, routers, switches, cloud infrastructure, or other network components or devices may be used to enforce segmentation on a network (and different address subnets may be used for each segment). Enforcement points may enforce segmentation by filtering or dropping packets according to the network segmentation policies/rules.

An entity or entities, as discussed herein, include devices (e.g., computer systems, for instance laptops, desktops, servers, mobile devices, IoT devices, OT devices, etc.), endpoints, virtual machines, services, serverless services (e.g., cloud based services), containers (e.g., user-space instances that work with an operating system featuring a kernel that allows the existence of multiple isolated user-space instances), cloud based storage, accounts, and users. Depending on the device, a device may have an IP address (e.g., a device) or may be without an IP address (e.g., a serverless service). Embodiments are able to dynamically (e.g., on the fly or responsive to changing conditions, for instance, a device being communicatively coupled to a network or in response to determination of characteristics of a device) control access of various entities or micro-segment various entities, as described herein.

The enforcement points may be one or more network devices (e.g., firewalls, routers, switches, virtual switch, hypervisor, SDN controller, virtual firewall, etc.) that are able to enforce access or other rules, ACLs, or the like to control (e.g., allow or deny) communication and network traffic (e.g., including dropping packets) between the device and one or more other entities communicatively coupled to a network. Access rules may control whether a device can communicate with other entities in a variety of ways including, but not limited to, blocking communications (e.g., dropping packets sent to one or more particular entities), allowing communication between particular entities (e.g., a desktop and a printer), allowing communication on particular ports, etc. It is appreciated that an enforcement point may be any device that is capable of filtering, controlling, restricting, or the like communication or access on a network.

Figure 1:
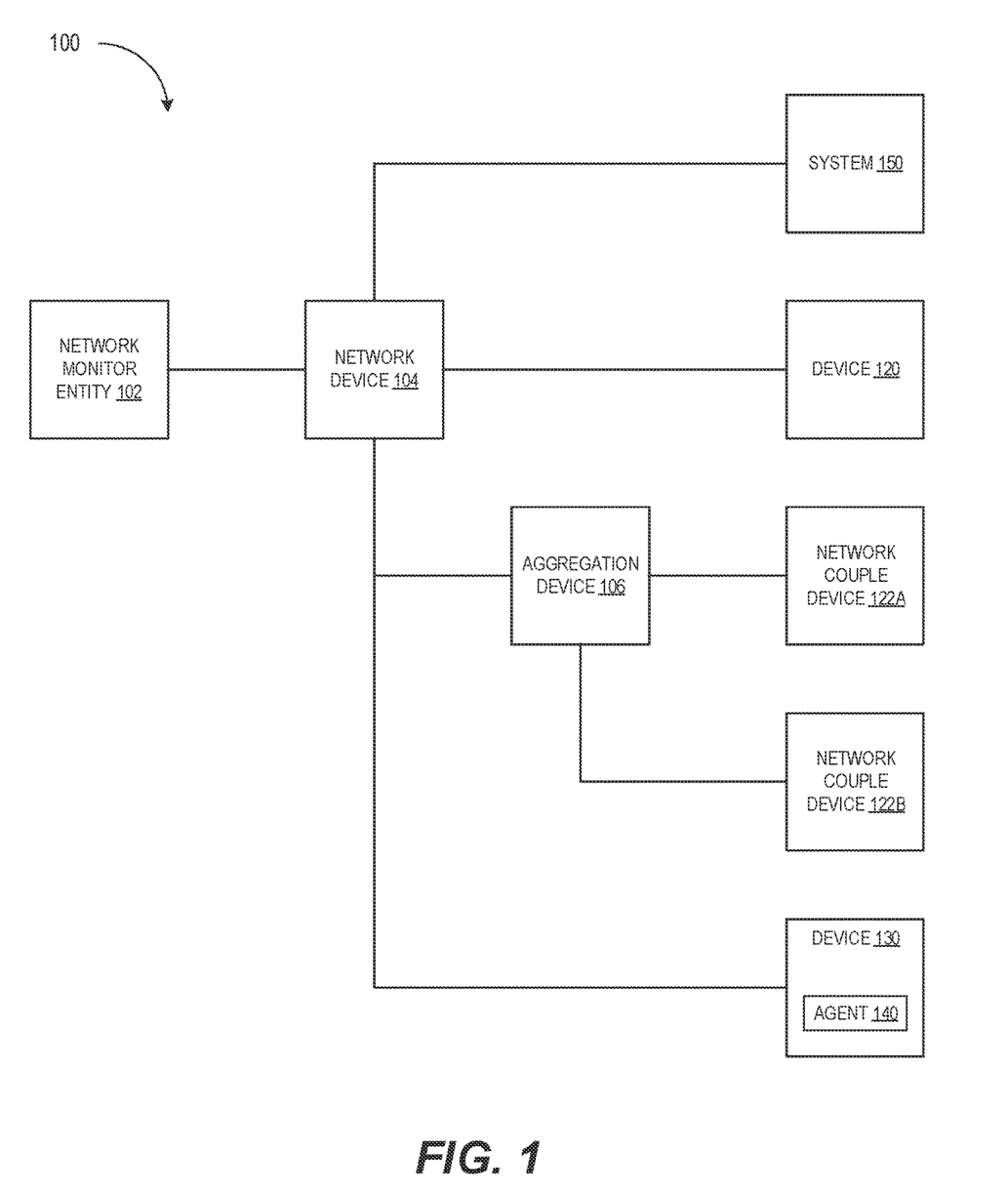
FIG. 1 depicts an illustrative communication network in accordance with one implementation of the present disclosure.

FIG. 1 depicts an illustrative communication network 100, in accordance with one implementation of the present disclosure. The communication network 100 includes a network monitor entity 102, a network device 104, an aggregation device 106, a system 150, devices 120 and 130, and network coupled devices 122a-b. The devices 120 and 130 and network coupled devices 122a-b may be any of a variety of devices including, but not limited to, computing systems, laptops, smartphones, servers, Internet of Things (IoT) or smart devices, supervisory control and data acquisition (SCADA) devices, operational technology (OT) devices, campus devices, data center devices, edge devices, etc. It is noted that the devices of communication network 100 may communicate in a variety of ways including wired and wireless connections and may use one or more of a variety of protocols.

Network device 104 may be one or more network devices configured to facilitate communication among aggregation device 106, system 150, network monitor entity 102, devices 120 and 130, and network coupled devices 122a-b. Network device 104 may be one or more network switches, access points, routers, firewalls, hubs, etc.

Network monitor entity 102 may be operable for a variety of tasks including determining data that is held on each of one or more devices on a network, determining a security risk of the device based at least on the data (e.g., whether or not the data is sensitive), and segmenting the network in response to if the security risk satisfies a threshold, such that accessibility to the offending device is reduced. In some embodiments, network monitor entity 102 can use local resources (e.g., processing, memory, data resources, or other resources), cloud resources, or a combination thereof for such an operation. In various embodiments, various libraries or an application programming interface (API) may be used to perform the operations of the network monitor entity 102.

Network monitor entity 102 can determine one or more enforcement points where the device is communicatively coupled to the network and thereby determine the one or more enforcement points closest to the device. For example, network monitor entity 102 may access information on a switch (e.g., a switch cache) to determine a port (e.g., physical port, wireless port, or virtual port) where a device with a particular IP address or MAC address or other identifier is communicatively coupled. Network monitor entity 102 may also access information from a wireless access point where the device is communicatively coupled. In some embodiments, network monitor entity 102 may poll information from a cloud service to determine where a device is communicatively coupled or connected to a network. In various embodiments, network monitor entity 102 access syslog or SNMP information from a device itself to determine where a device is communicatively coupled or connected to a network (e.g., without accessing information from a network device or enforcement point). Network monitor entity 102 supports applying access policies in situations where a device is communicatively coupled to a network with more than one connection (e.g., a wired connection and a wireless connection).

Based on the enforcement point, network monitor entity 102 may determine the one or more access rules to be assigned to the one or more enforcement points based on an access policy. In some embodiments, based on information about the one or more enforcement points closest to the device, network monitor entity 102 translates the access policy into one or more commands that will be used to configure the access rules on the one or more enforcement points.

The closest enforcement point to a device can be enforcement point where the device is communicatively coupled. The enforcement point may be network device or network infrastructure device closest in proximity (e.g., physical proximity) to the device. The enforcement point comprises the port where the device is communitive coupled to the network, and communication to and from the device is sent first through that port. In some embodiments, the port of the enforcement point is the last point of communication within network infrastructure before communication is sent to the device. In various embodiments, the closest enforcement point is where communication from the device is initially sent when communications are sent from the device (e.g., prior to communications with the network backbone or Internet backbone). For example, the closest enforcement to a device connected to a switch is the switch. As another example, the closest enforcement point to a device wirelessly communicatively coupled to a wireless access point is the wireless access point. In various embodiments, network monitor entity 102 may access the current configuration of the one or more enforcement points to determine the access rules (e.g., ACLs) that are to be applied to the one or more enforcement points, as described herein. In some embodiments, a device is communicatively coupled to a wireless controller via a wireless access point and the wireless controller or a switch is the closest enforcement point (e.g., based on the wireless controller or the switch being able to apply access rules, for instance ACLs, to communications of the device, for instance, in the case where the wireless access point is not able to or does not have the functionality to apply access rules). In various embodiments, a device is communicatively coupled to a layer 3 switch via a layer 2 switch and the layer 3 switch is the closest enforcement point (e.g., based on the layer 3 switch being able to apply access rules, for instance ACLs, to communications of the device, for instance, in the case where the layer 2 switch is not able to or does not have the functionality to apply access rules).

Network monitor entity 102 may then apply or assign the access rules to the one or more enforcement points closest to the device. Network monitor entity 102 may communicate the access rules via application programming interfaces (APIs), command line interface (CLI) commands, Web interface, simple network management protocol (SNMP) interface, etc. In some embodiments, network monitor entity 102 may verify that the one or more enforcement points have been properly or correctly configured based on the access rules.

Network monitor entity 102 may provide an interface (e.g., a graphical user interface (GUI)) for viewing, monitoring, and modifying classification or associated thresholds associated with one or more models. Network monitor entity 102 may further monitor network traffic over time to reclassify entities as new entities join the network, entities rejoin the network, and new models are made available.

Network monitor entity 102 may further perform a variety of operations including identification, classification, and taking one or more re mediation actions (e.g., changing network access of a device, changing the virtual local area network (VLAN), sending an email, sending a short message service (SMS) message, etc.).

Network monitor entity 102 may also parse network traffic. For example, the network monitor entity 102 may parse (e.g., read, analyze, access, etc.) different protocol fields of the network traffic (e.g., packets, messages, frames, etc.). The network monitor entity 102 may provide the field values of the protocol fields (e.g., values of certain portions of network packets, messages, frames, etc.) to one or more different processing engines (e.g., rule engines, machine learning models, etc.) that may request the protocol fields, as discussed in more detail below. The network monitor entity 102 may include a parser and one or more processing engines, as described herein.

An enforcement point may be a router, firewall, switch, hypervisor, software-defined networking (SDN) controller, virtual firewall, or other network device or infrastructure that may have an ACL like or rule like policy or functionality to apply based on the port where a device is communicatively coupled thereto. Enforcements points may also be a next generation firewall (NGFW) and cloud infrastructure. A NGFW can be updated with an ACL like policy regarding a device accessing the Internet. Cloud infrastructure (e.g., Amazon web services (AWS) security groups) can be updated to drop packets from the IP of the device that have a destination outside the cloud. Embodiments are operable to configure enforcement points at the edge of a network where a device is communicatively coupled thereto thereby controlling access of the device on a customized basis (e.g., customized or tailored for the device).

In some embodiments, if the categorization or characteristics functionality is being updated (e.g., which could result in a change in one or more access rules that are assigned to an enforcement point closest a device and thus impact the enforcement of an access policy by the enforcement points), notifications may be sent (e.g., via email or other methods as described herein) or presented to a user (e.g., via a graphical user interface (GUI)) to indicate that the categorization or characteristics of one or more entities is changing and should be confirmed before one or more enforcement points are updated based on the changed categorization or characteristics. After conformation, the access rules may be changed.

Network monitor entity 102 may be a computing system, network device (e.g., router, firewall, an access point), network access control (NAC) device, intrusion prevention system (IPS), intrusion detection system (IDS), deception device, cloud-based device, virtual machine based system, etc. Network monitor entity 102 may be communicatively coupled to the network device 104 in such a way as to receive network traffic flowing through the network device 104 (e.g., port mirroring, sniffing, acting as a proxy, passive monitoring, etc.). In some embodiments, network monitor entity 102 may include one or more of the aforementioned devices. In various embodiments, network monitor entity 102 may further support high availability and disaster recovery (e.g., via one or more redundant devices).

In some embodiments, network monitor entity 102 may monitor a variety of protocols (e.g., Samba, hypertext transfer protocol (HTTP), secure shell (SSH), file transfer protocol (FTP), transfer control protocol/internet protocol (TCP/IP), user datagram protocol (UDP), Telnet, HTTP over secure sockets layer/transport layer security (SSL/TLS), server message block (SMB), point-to-point protocol (PPP), remote desktop protocol (RDP), windows management instrumentation (WMI), windows remote management (WinRM), etc.).

The monitoring of entities by network monitor entity 102 may be based on a combination of one or more pieces of information including traffic analysis, information from external or remote systems (e.g., system 150), communication (e.g., querying) with an aggregation device (e.g., aggregation device 106), and querying the device itself (e.g., via an application programming interface (API), command line interface (CLI), web interface, simple network management protocol (SNMP), etc.). Network monitor entity 102 may be operable to use one or more APIs to communicate with aggregation device 106, device 120, device 130, or system 150. Network monitor entity 102 may monitor for or scan for entities that are communicatively coupled to a network via a NAT device (e.g., firewall, router, etc.) dynamically, periodically, or a combination thereof.

Information from one or more external or third party systems (e.g., system 150) may further be used for determining one or more tags or characteristics for a device. For example, a vulnerability assessment (VA) system may be queried to verify or check if a device is in compliance and provide that information to network monitor entity 102. External or third party systems may also be used to perform a scan or a check on a device to determine a software version.

Device 130 can include agent 140. The agent 140 may be a hardware component, software component, or some combination thereof configured to gather information associated with device 130 and send that information to network monitor entity 102. The information can include the operating system, version, patch level, firmware version, serial number, vendor (e.g., manufacturer), model, asset tag, software executing on a device (e.g., anti-virus software, malware detection software, office applications, web browser(s), communication applications, etc.), services that are active or configured on the device, ports that are open or that the device is configured to communicate with (e.g., associated with services running on the device), media access control (MAC) address, processor utilization, unique identifiers, computer name, account access activity, etc. The agent 140 may be configured to provide different levels and pieces of information based on device 130 and the information available to agent 140 from device 130. Agent 140 may be able to store logs of information associated with device 130. Network monitor entity 102 may utilize agent information from the agent 140. While network monitor entity 102 may be able to receive information from agent 140, installation or execution of agent 140 on many entities may not be possible, e.g., IoT or smart devices.

System 150 may be one or more external, remote, or third party systems (e.g., separate) from network monitor entity 102 and may have information about devices 120 and 130 and network coupled devices 122*a-b*. System 150 may include a vulnerability assessment (VA) system, a threat detection (TD) system, endpoint management system, a mobile device management (MDM) system, a firewall (FW) system, a switch system, an access point system, etc. Network monitor entity 102 may be configured to communicate with system 150 to obtain information about devices 120 and 130 and network coupled devices 122*a-b* on a periodic basis, as described herein. For example, system 150 may be a vulnerability assessment system configured to determine if device 120 has a computer virus or other indicator of compromise (10C).

The vulnerability assessment (VA) system may be configured to identify, quantify, and prioritize (e.g., rank) the vulnerabilities of a device. The VA system may be able to catalog assets and capabilities or resources of a device, assign a quantifiable value (or at least rank order) and importance to the resources, and identify the vulnerabilities or potential threats of each resource. The VA system may provide the aforementioned information for use by network monitor entity 102.

The advanced threat detection (ATD) or threat detection (TD) system may be configured to examine communications that other security controls have allowed to pass. The ATD system may provide information about a device including, but not limited to, source reputation, executable analysis, and threat-level protocols analysis. The ATD system may thus report if a suspicious file has been downloaded to a device being monitored by network monitor entity 102.

Endpoint management systems can include anti-virus systems (e.g., servers, cloud based systems, etc.), next-generation antivirus (NGAV) systems, endpoint detection and response (EDR) software or systems (e.g., software that record endpoint-system-level behaviors and events), compliance monitoring software (e.g., checking frequently for compliance).

The mobile device management (MDM) system may be configured for administration of mobile devices, e.g., smartphones, tablet computers, laptops, and desktop computers. The MDM system may provide information about mobile devices managed by MDM system including operating system, applications (e.g., running, present, or both), data, and configuration settings of the mobile devices and activity monitoring. The MDM system may be used get detailed mobile device information which can then be used for device monitoring (e.g., including device communications) by network monitor entity 102.

The firewall (FW) system may be configured to monitor and control incoming and outgoing network traffic (e.g., based on security rules). The FW system may provide information about a device being monitored including attempts to violate security rules (e.g., unpermitted account access across segments) and network traffic of the device being monitored.

The switch or access point (AP) system may be any of a variety of network devices (e.g., network device 104 or aggregation device 106) including a network switch or an access point, e.g., a wireless access point, or combination thereof that is configured to provide a device access to a network. For example, the switch or AP system may provide MAC address information, address resolution protocol (ARP) table information, device naming information, traffic data, etc., to network monitor entity 102 which may be used to monitor entities and control network access of one or more entities. The switch or AP system may have one or more interfaces for communicating with IoT or smart devices or other devices (e.g., ZigBee™, Bluetooth™, etc.), as described herein. The VA system, ATD system, and FW system may thus be accessed to get vulnerabilities, threats, and user information of a device being monitored in real-time which can then be used to determine a risk level of the device.

Aggregation device 106 may be configured to communicate with network coupled devices 122*a-b* and provide network access to network coupled devices 122*a-b*. Aggregation device 106 may further be configured to provide information (e.g., operating system, device software information, device software versions, device names, application present, running, or both, vulnerabilities, patch level, etc.) to network monitor entity 102 about the network coupled devices 122*a-b*. Aggregation device 106 may be a wireless access point that is configured to communicate with a wide variety of devices through multiple technology standards or protocols including, but not limited to, Bluetooth™, Wi-Fi™, ZigBee™, Radio-frequency identification (RFID), Light Fidelity (Li-Fi), Z-Wave, Thread, Long Term Evolution (LTE), Wi-Fi™ HaLow, HomePlug, Multimedia over Coax Alliance (MoCA), and Ethernet. For example, aggregation device 106 may be coupled to the network device 104 via an Ethernet connection and coupled to network coupled devices 122*a-b* via a wireless connection. Aggregation device 106 may be configured to communicate with network coupled devices 122a-b using a standard protocol with proprietary extensions or modifications.

Aggregation device 106 may further provide log information of activity and properties of network coupled devices 122a-b to network monitor entity 102. It is appreciated that log information may be particularly reliable for stable network environments (e.g., where the types of devices on the network do not change often). The log information may include information of updates of software of network coupled devices 122a-b.

Figure 2:
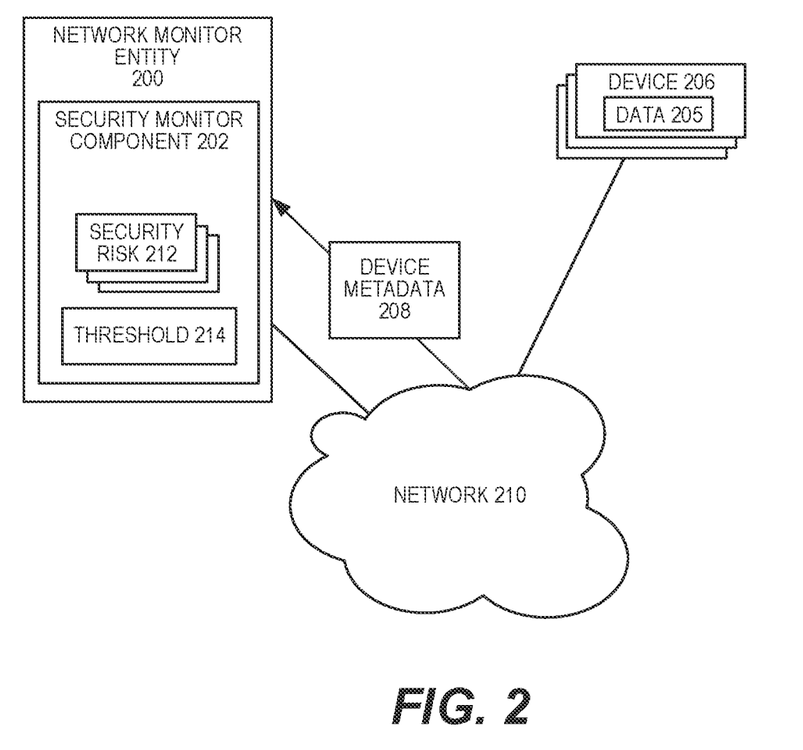
FIG. 2 depicts an illustrative computer network in accordance with one implementation of the present disclosure.

FIG. 2 depicts an illustrative computer network with a security monitor component 202 in accordance with one implementation of the present disclosure. One or more of devices 206 may communicate with each other over a network 210. These devices may include computer servers, IoT devices (e.g., a television, sensors, appliances, medical equipment, exercise equipment, or other IoT device), personal computers, databases, mobile phones, tablet computers, proprietary operational technology (OT), one or more entities, and more.

Network monitor entity 200 may be communicatively coupled to the network 210. Network monitor entity 200 may include a security monitor component 202. This component 202 may determine data 205 that is held on each of one or more devices that are connected to a network. For example, the network monitor entity 200 may obtain device metadata 208 that includes file names, file types, data signatures, network traffic information or other metadata that indicates the type or sensitivity of data that is held on each of devices 206.

In some examples, network monitor entity 200 may obtain the metadata 208 through accessing an API of the device (e.g., via an API call). In some examples, network monitor entity may obtain the metadata from a third party device (e.g., system 150) that is on the network 210. The network monitor entity 200, the third party device, or a combination thereof may classify how critical the data on a given device is. Device metadata 208 may also include other device information such as registry keys that indicate what software is installed on a given device, what services or applications are currently running on a device, port configuration of a device, or other factors that may indicate a level of vulnerability of a device.

Network monitor entity 200 may determine a security risk of each of the one or more devices based at least on the data 205. In some examples, the security risk may be determined as a score. The network monitor entity 200 may calculate the security risk using an algorithm that combines the sensitivity of the data 205 and how vulnerable the device is to an attack. The vulnerability of the device may be determined by one or more factors, such as, for example, the type of data on the device, ports that are open on the device, applications (e.g., malicious applications) or services that are running on the device, monitoring software on a device, a network that the device is coupled to, other factors discussed with respect to the VA (in FIG. 1), or a combination thereof.

In response to the security risk of one of the one or more devices satisfying a threshold, network monitor entity 200 may segment the network and place the risky or offending device on a less accessible segment of the network (resulting from the network segmentation) thereby reducing the security risk of offending device in a proactive manner. The network monitor entity may create subnets to subdivide the network 210 into segments. Network segmentation may be performed by configuring the access rules on the one or more enforcement points, as discussed herein. The offending device may be moved to a protected or less accessible segment of the network, thereby reducing the vulnerability of the device and reducing the overall security risk of the device so that it no longer satisfies the threshold. In some examples, communication going into a device, or communication between two devices may be restricted, in response to the security risk of the one or more devices satisfying the threshold.

In some embodiments, in response to the security risk satisfying the threshold, network monitor entity 200 may cause a service or application that is running on the one or more managed devices to exit, close, terminate, etc. For example, the network monitor entity may poll each of the devices on the network to determine which services or applications on a device is active. The network monitor entity 200 may determine that some of the services or applications pose a risk. Network monitor entity may access an API or CLI of the device to terminate the services or applications.

Network monitor entity 200 may use a lookup table or database to determine what the security risk is for a given factor. For example, network monitor entity 200 may refer to a lookup table or database, which may have entries that are entered by a customer or pulled from a server. The lookup table or database may indicate a security risk associated with different services, applications, ports, and other factors. The lookup table or database may also include one or more weights that may be associated with a given factor. For example, the type of data on a device may be given a weight 'x' while the type of applications running on the device may be given a weight 'y'. These weights may vary and be adjusted through experimentation.

Network monitor entity 200 may close or open a port of the one or more devices 206, in response to the security risk satisfying the threshold. Network monitor entity may poll the device to determine which of the ports are closed or open on a given device. A port may be understood as a point where network connections start and end. Ports may be virtual ports (e.g., software-based), and managed by an operating system of a device. Certain ports may be designated or commonly used for known protocols. For example, ports 20 and 21 may be commonly used for FTP, port 22 may be commonly used for SSH, port 80 may be commonly used for HTTP and so on. The network monitor entity may close a port on a device to reduce the vulnerability of a device, thereby reducing a security risk of the device.

For example, if network monitor entity 200 determines that data on a device is sensitive, it may segment the network to reduce access to the device or close one or more ports of the device, or combination thereof. Similarly, network monitor entity 200 may determine that the device does not hold sensitive data, and may adjust the segmentation of the network, or placement of the device within the network segments, so that the device is coupled (e.g., communicatively) to a more accessible region or segment of the network.

Network monitor entity 200 may update an operating system or firewall on one of the one or more devices, in response to the security risk satisfying the threshold. For example, network monitor entity may determine that the data on a given device is sensitive. The network monitor entity may update an operating system of the device from version 'x' to version 'x.1', knowing that version x has security vulnerabilities that version x.1 has resolved. Additionally, or alternatively, the network may be segmented so that the device is coupled to a network segment with less access.

The security risk of a given device may be determined as higher if a sensitivity of the data is increased. Similarly, the security risk may be determined as higher if a vulnerability of the one or more devices is increased. The vulnerability of the device may be determined based on one or more factors, as described. As such, the network monitor entity may reduce the security risk of a device by decreasing the vulnerability of a device, such as by moving the device to a less accessible (e.g., more secure) network segment, or mitigating some of the other factors, or a combination thereof.

Figure 3:
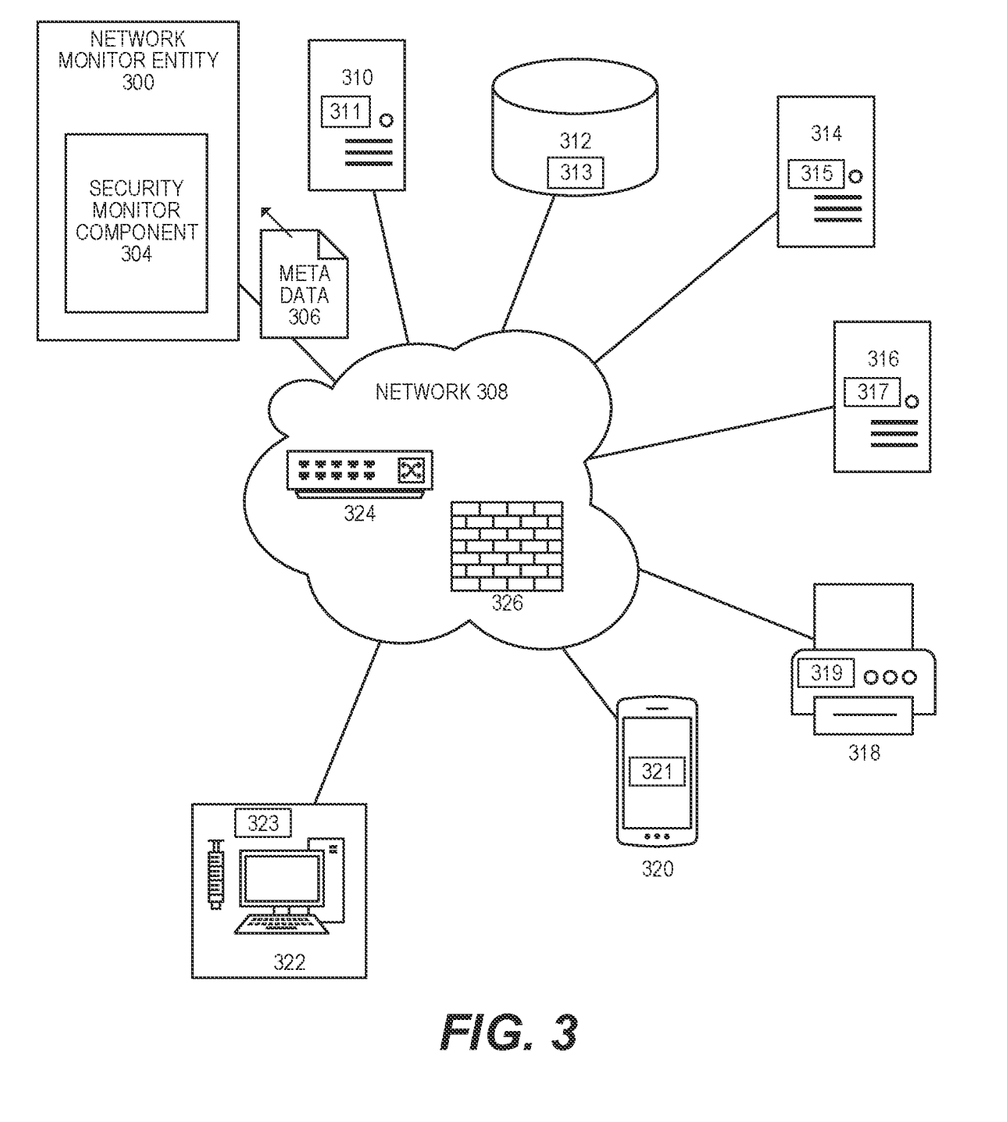
FIG. 3 depicts an illustrative computer network with example devices in accordance with one implementation of the present disclosure.

FIG. 3 depicts an illustrative computer network 308 with example devices in accordance with one implementation of the present disclosure. A network monitor entity 300 may include a security monitor component 304 that determines the data (311, 313, 315, 317, 319, 321, and 323) held on each device (e.g., 310, 312, 314, 316, 318, 320, and 322) that is coupled to network 308. This data may be determined by obtaining device metadata 306 which may describe the data held on each device or a sensitivity of data held on each device as-classified by a third party device, application, or other source. For example, device metadata 306 may include a description of the data on each device (e.g., file names, data signatures, network traffic, a classification of data on each device, file sizes, file types, or a combination thereof) or the criticality of data of each device (e.g., if the data criticality has been classified by and obtained from a third party) on the network 308.

Network 308 may include one or more network devices such as a switch 324, a firewall 326, or other network devices such as network device 104. Network monitor entity 300 may segment network 308 into network segments (such as network segment 430 in FIG. 4), through enforcement points such as 324, 326, or other enforcement points. A network segment may also be understood as a subnet.

In some examples, network monitor entity 300 may obtain metadata 306 from each of the devices in an agentless manner. For example, network monitor entity 300 may obtain metadata 306 by monitoring network traffic, accessing API of the devices, or other agentless method. Network monitor entity 300 may use different communication protocols to gather the various metadata 306 from the various devices, depending on which communication protocol is compatible with a given device.

In some examples, network monitor entity 300 may access an API of the one or more devices to obtain the metadata 306. For example, device 314 may include a server that operates as a software as a service (SaaS), such as Box, OneDrive, or other SaaS. Network monitor entity may gather metadata 306 that describes data 315 that is held by device 314 through an API. For example, in addition to device 314, network monitor entity 300 may discover that a database 312 (e.g., associated with a database server, a cloud based database, etc.) is coupled to network 308. Network monitor entity 300 may obtain metadata 306 that indicates the data 313 that is held on database 312 through a structured query language (SQL) communication. Device 310 may include an FTP server and hold data 311. Network monitor entity may use an FTP communication to determine the data 311 that is held on device 310. Device 316 may be a personal computer (PC) which may operate as a server. Network monitor entity may use a server message block (SMB) protocol or windows management instrumentation remote (WMI) protocol to obtain metadata 306 from device 316 and determine the data 317 that is held on device 316. Network monitor entity 300 may determine data on other devices on the network such as, for example, a mobile device, a printer 318, using a compatible communication protocol.

In some examples, OT or medical equipment 322 may be coupled to the network 308. OT devices may include network-connected devices that manage lighting, heating, cooling, surveillance, or other devices that detect or cause a physical change in an environment. Medical equipment may include heart monitors, blood pressure monitors, ventilation systems, glucometers, and other medical equipment. Network monitor entity 300 may communicate with device 322 with a corresponding protocol to obtain metadata 306 that describes the data 323 that is held on device 322.

In some examples, the data or metadata may be obtained by network monitor entity 300 from each of the one or more devices with an agentless interrogation procedure. As described, the network monitor entity may discover the device on the network and then use a corresponding and compatible protocol to gather metadata 306 about each device that indicates the sensitivity of the data held on the device and factors that indicate the vulnerability of the device.

Additionally, or alternatively, network monitor entity may leverage existing systems, for example, by obtaining classifications of the data on each machine (e.g., 'has sensitive data' or 'does not have sensitive data') from a third party server or application that has already classified the data on each device on the network.

Network 308 may include other network devices such as, for example, a virtual private network device, a load balancer, or other network devices that may be configured by network monitor entity 300 to segment the network 308.

Figure 4:
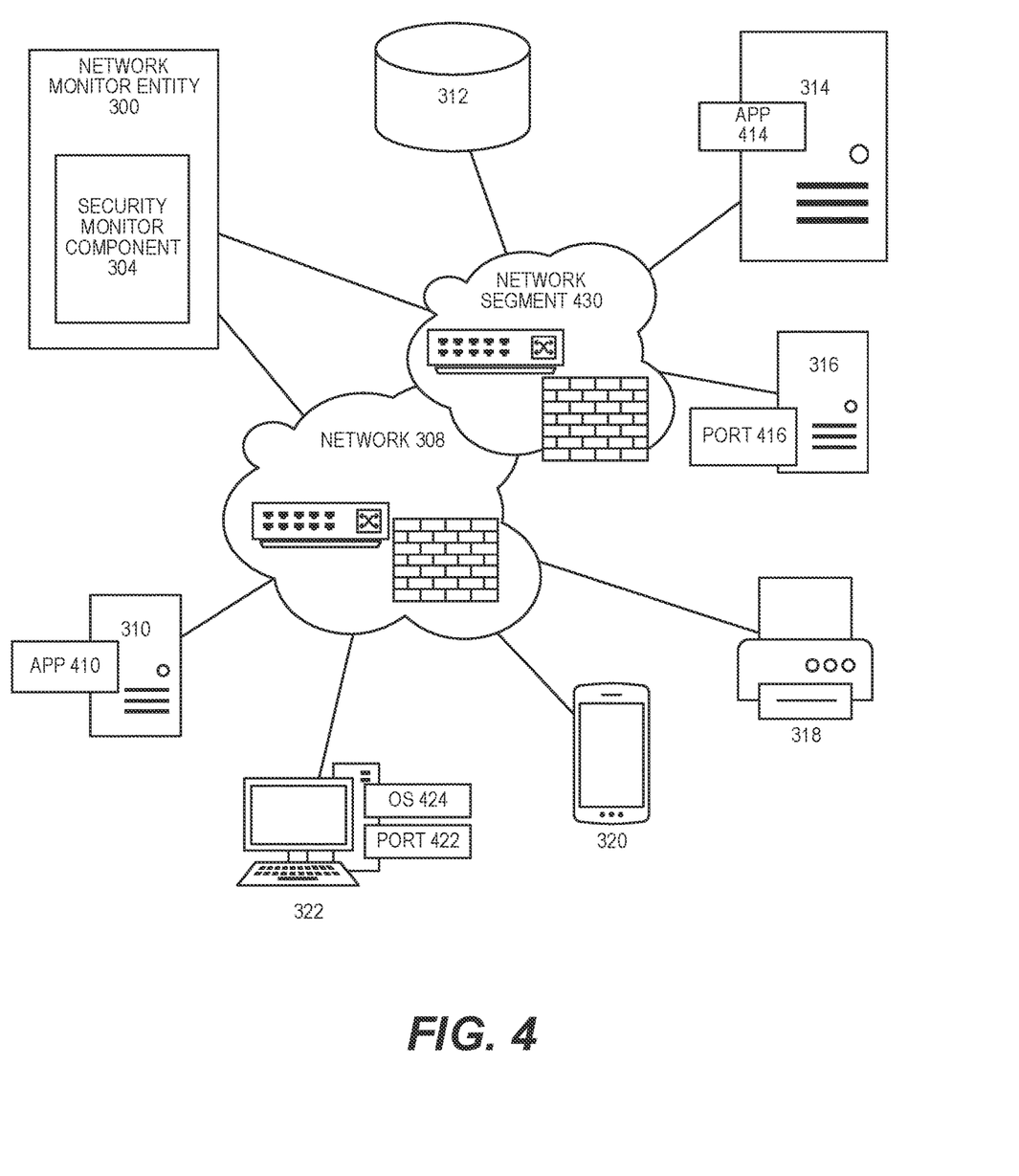
FIG. 4 depicts an illustrative computer network with segmentation in accordance with one implementation of the present disclosure.

FIG. 4 depicts an illustrative computer network with segmentation in accordance with one implementation of the present disclosure. Following the example in FIG. 3, FIG. 4 shows various examples of actions that network monitor entity 300 may take in response to when the security risk of the one or more devices satisfies a threshold. For example, network monitor entity 300 may perform network segmentation to create a network segment 430 (which may be a subnet of network 308).

Network monitor entity 300 may configure the enforcement points, which may include a network device or network infrastructure device, or a combination thereof, to place device 312, 314, or 316 on network segment 430 in response a security risk of device 312, 314, or 316 satisfying a threshold. Network segment 430 may have limited access, for example, it may be restricted by access policies to be accessible to a subset of authenticated users, and not to others. Users may be authenticated through username, passwords, cryptographic keys, tokens, or other authentication schemes.

Additionally, network monitor entity 300 may determine that application or service 414 on device 314 may be malicious, thereby increasing the vulnerability of this device. Network monitor entity 300 may cause this application (or service) to terminate.

Similarly, network monitor entity 300 may determine that a port 416 on device 316 is open, and that this open port increases the vulnerability of device 316. Network monitor entity 300 may cause this port 416 to close, thereby blocking communications over the port.

Network monitor entity may reduce the security risk posed by some devices without placing them on a more secure network, if those devices do not hold sensitive data. For example, network monitor entity 300 may determine that an application or service 410 is malicious on device 310, but this device may not hold sensitive data. As such, network monitor entity 300 may still terminate the application or service 410, but keep the device 310 on the more accessible region of network 308 if the device does not hold sensitive data.

Similarly, network monitor entity 300 may determine that device 322 has one or more ports 422 open, or an operating system 424 that has an older and more vulnerable version. These factors may be determined as increasing the vulnerability of device 322. Network monitor entity 300 may close ports 422, update operating system 424, or a combination thereof. Further, network monitor entity may keep device 322 on the more accessible region of network 308, if the device does not have sensitive data, or if the security risk of the device does not satisfy the threshold, or both.

Additionally, if a device does not hold sensitive data, but the device is deemed to be vulnerable (e.g., based on other factors), the network monitor entity may refer to a history of the device that does not currently hold sensitive data to determine if it has held sensitive data in the past. If so, then the network monitor entity may place the device on a less accessible network (e.g., network segment 430) proactively, even if it does not currently hold sensitive data. In some embodiments, if the device has held sensitive data within a given time period, (e.g., within 'x' days), then the network monitory entity may place the device on the less accessible network proactively. Otherwise, the network monitor entity may keep the device on the current network 308.

In some embodiments, if network monitor entity 300 deems a device to be vulnerable and but the network monitor entity cannot correct the one or more factors that make the device vulnerable (e.g., the ports may not be reconfigured, a vulnerable service or application may not be terminated, or an operating system may not be patched) then network monitor entity 300 may segment the network and place the device on the less accessible network 430, to proactively mitigate potential security risks.

As such, network monitor entity may mitigate security risks in some cases by changing port settings, terminating applications or services, or updating an operating system, when a device does not currently hold sensitive data. Network monitor entity may proactively move the device to a more secure network if the device has previously held sensitive data, in addition to performing other mitigation operations (e.g., changing port settings, terminating applications or services, or updating an operating system). Network monitor entity may also proactively move the device to a more secure network segment if the device vulnerability cannot be reduced. In some examples, applications or services that are outdated and vulnerable may be updated, by initiating, within the device, a software install or upgrade.

Figure 5:
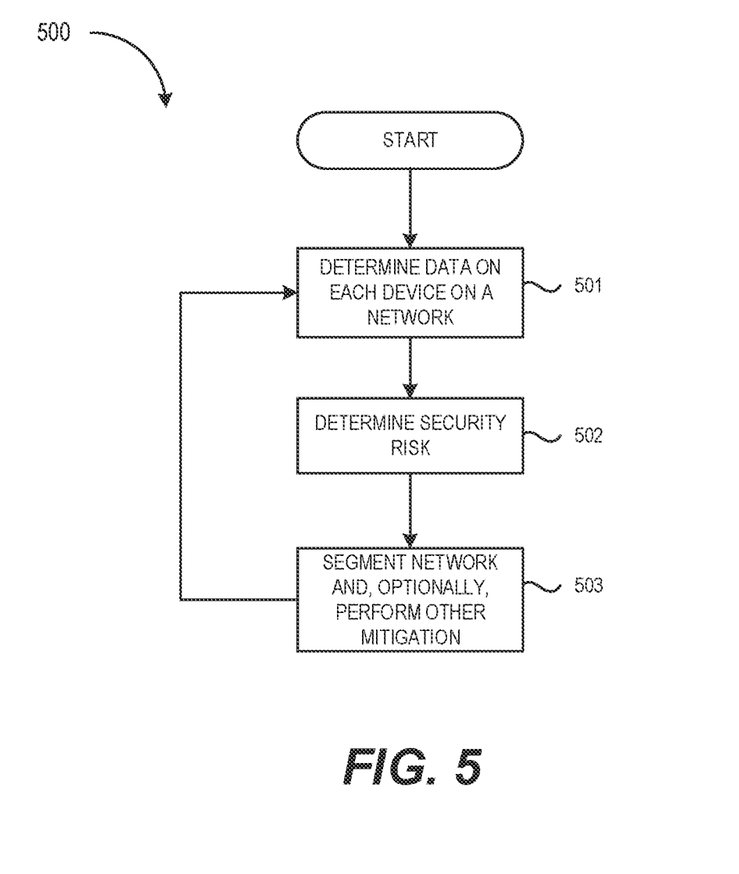
FIG. 5 depicts a process for a centralized network response to a data-based security risk in accordance with one implementation of the present disclosure.
Figure 6:
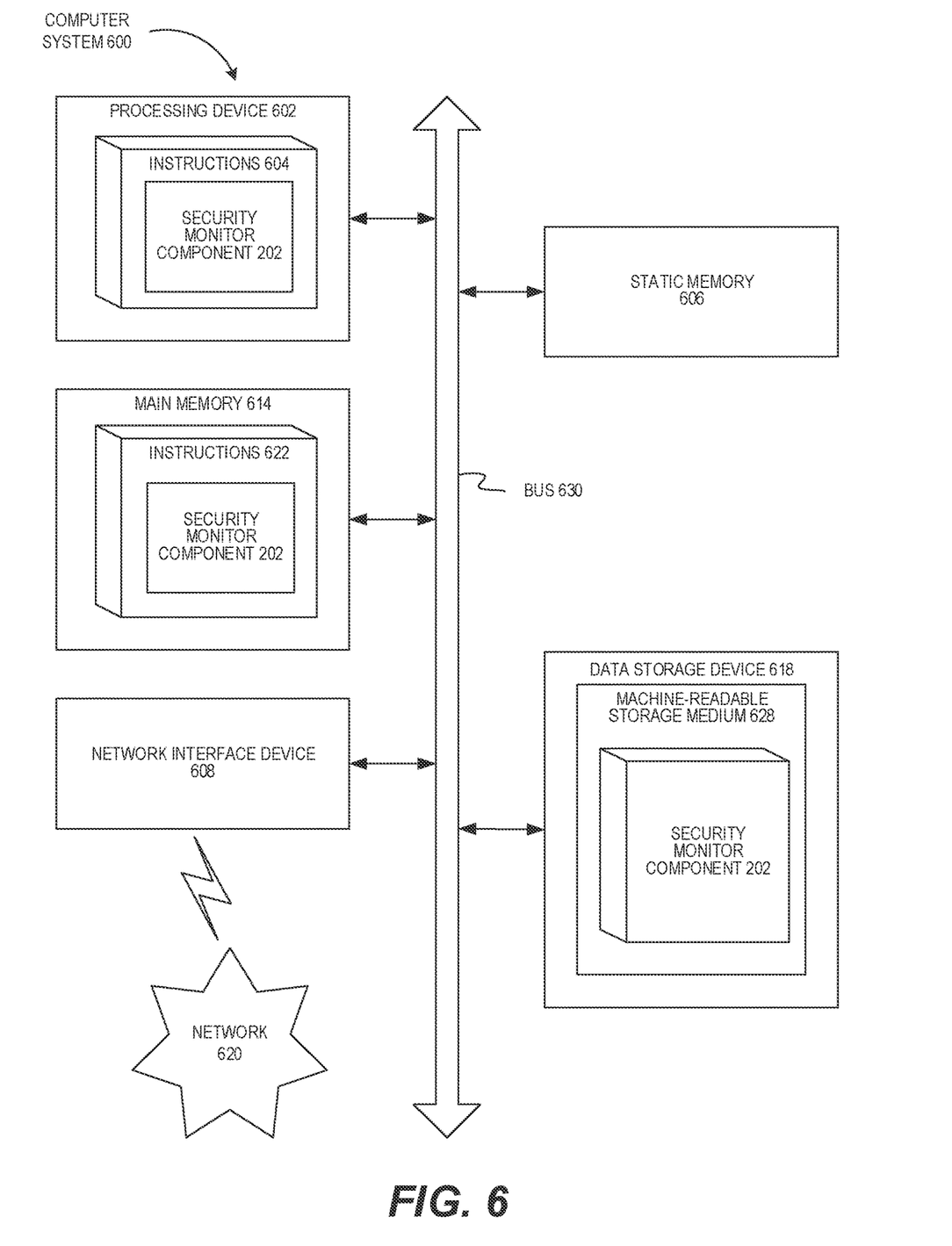
FIG. 6 is a block diagram illustrating an example computer system, in accordance with one implementation of the present disclosure.

FIG. 5 depicts a process for a centralized network response to a data-based security risk in accordance with one implementation of the present disclosure. Some or all of process 500 may be performed by one or more components (e.g., components of system 600) of an entity or device (e.g., network monitor entity 102, 200, 300, etc.).

At block 501, the process includes determining data that is held on each of one or more devices that are connected to a network. Network discovery may be performed to determine which devices are on a given network. Once the devices are known, the data on each device may be determined by individually polling each device through a compatible protocol, by obtaining classifications of data on each device through a third party device, through obtaining and parsing network traffic, or a combination thereof, as described herein.

At block 502, the process includes determining a security risk of each of the one or more devices based at least on the data held on a respective device. The security risk of a given device may be determined as a product or sum of how sensitive the data is on that device, and how vulnerable that device is. Further, the vulnerability of the device may depend on additional factors such as port configuration (e.g., open or closed ports), applications or services that are running on the device, operating system, anti-virus software, or versions thereof that reside on a given device, as described herein. In some examples, the data may be classified with a plurality of levels or a score that indicates how sensitive the data is. In other examples, the data may be classified or scored as a binary value that indicates that a device holds sensitive data or it does not hold sensitive data.

At block 503, the process includes segmenting the network in response to the security risk of one of the one or more devices satisfying a threshold, such that the one of the one or more devices that satisfies the threshold is placed on a less accessible segment of the network which reduces the security risk of the one or more devices. The less accessible segment of the network may have a stricter access policy enforced on it than the rest of the network.

In some aspects, the threshold may be satisfied by a device if the device is determined to hold any sensitive data. In other examples, the threshold may be satisfied based on a sum or product of factors, as discussed herein. Optionally, mitigation may be performed such as terminating applications or services, closing ports, updating an operating system, firmware, anti-virus software, or other software of a device, to reduce the vulnerability of the device. Additionally, a history of a device may be kept to determine if the device which does not currently hold sensitive data has held sensitive data in the past. If so, or if it has held sensitive data within a threshold period of time (e.g., in the last 'X' days), then the device may be moved to the less accessible network, even if it does not currently hold sensitive data.

The process may be repeated to continuously monitor and update the network. As such, if software, data, an operating system, known weaknesses, or other factors of a device change over time, the process can configure the network or the devices accordingly to reduce the security risk posed by a device.

FIG. 6 is a block diagram illustrating an example computer system 600, in accordance with one implementation of the present disclosure. This can be understood as a diagrammatic representation of a machine in the example form of a computer system within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet.

The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In some embodiments, computer system 600 may be representative of a server, such as network monitor entity 102, 200, or 300, that runs a security monitor component 202 or 304 to determine a security risk of each device on a network based at least on the data held by each device, and segment the network in response to the security risk satisfying a threshold, as described herein.

The exemplary computer system 600 includes a processing device 602, a main memory 614 (e.g., read-only memory (ROM), flash memory, dynamic random access memory (DRAM)), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection or coupling between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 604 which may include security monitor component 202, for performing the operations and blocks discussed herein.

The data storage device 618 may include a machine-readable storage medium 628, on which is stored one or more set of instructions 622 (e.g., software) embodying any one or more of the methodologies of operations described herein, including instructions to cause the processing device 602 to execute security monitor component 202. The instructions 622 may also reside, completely or at least partially, within the main memory 614 or within the processing device 602 during execution thereof by the computer system 600; the main memory 614 and the processing device 602 also constituting machine-readable storage media. The instructions 622 may further be transmitted or received over a network 620 via the network interface device 608.

The machine-readable storage medium 628 may also be used to store instructions to perform a method for determining and mitigating security risk of devices on a network, based on the data they hold, as described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions.

A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

When an action, function, operation, etc., is described herein as being performed automatically, this may indicate that the action, function, operation, etc., may be performed without requiring human or user input, invocation, or interaction.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion.

As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances.

In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method, comprising:
   determining data that is held on each of one or more devices that are connected to a respective current segment of a network;
   determining a security risk of each of the one or more devices based at least on the data and sensitivity of previously stored data on the one or more devices; and
   in response to the security risk of one of the one or more devices satisfying a threshold, segmenting the network such that the one of the one or more devices is placed on a less accessible segment than the respective current segment of the network, wherein being placed on the less accessible segment reduces the security risk of the one of the one or more devices.

2. The method of claim 1, further comprising: in response to the security risk satisfying the threshold, causing a service or application that is running on the one of the one or more devices to exit.

3. The method of claim 1, further comprising: in response to the security risk satisfying the threshold, closing a port of the one of the one or more devices.

4. The method of claim 1, further comprising: in response to the security risk satisfying the threshold, updating an operating system or firewall on the one of the one or more devices.

5. The method of claim 1, wherein determining the data that is held on each of one or more devices includes accessing an API of the one or more devices to obtain the data.

6. The method of claim 1, wherein determining the data that is held on each of one or more devices includes accessing a third party server to obtain the data.

7. The method of claim 1, wherein the security risk of each of the one or more devices is determined as being higher in response to an increase in the sensitivity of the data a respective one of the one or more devices and in response to an increase in a vulnerability of the respective one of the one or more devices.

8. The method of claim 1, wherein the data is obtained from each of the one or more devices with an agentless interrogation procedure.

9. The method of claim 1, further comprising keeping the one of the one or more devices on the respective current segment of the network if it does not hold sensitive data.

10. The method of claim 1, further comprising keeping the one of the one or more devices on the respective current segment of the network if the one or more devices does not currently hold sensitive data, unless the previously stored data on the one of the one or more devices held sensitive data and is determined as vulnerable.

11. A system, comprising:
    a memory; and
    a processing device, operatively coupled to the memory, to:
      determine data that is held on each of one or more devices that are connected to a respective current segment of a network;
      determine a security risk of each of the one or more devices based at least on the data and sensitivity of previously stored data on the one or more devices; and
      in response to the security risk of one of the one or more devices satisfying a threshold, segment the network such that the one of the one or more devices is placed on a less accessible segment than the respective current segment of the network, wherein being placed on the less accessible segment reduces the security risk of the one of the one or more devices.

12. The system of claim 11, wherein the processing device is further to: in response to the security risk satisfying the threshold, causing a service or application that is running on the one of the one or more devices to exit.

13. The system of claim 11, wherein the processing device is further to: in response to the security risk satisfying the threshold, closing a port of the one of the one or more devices.

14. The system of claim 11, wherein the processing device is further to: in response to the security risk satisfying the threshold, updating an operating system or firewall on the one of the one or more devices.

15. The system of claim 11, wherein determining the data that is held on each of one or more devices includes accessing an API of the one or more devices to obtain the data.

16. The system of claim 11, wherein determining the data that is held on each of one or more devices includes accessing a third party server to obtain the data.

17. The system of claim 11, wherein the security risk of each of the one or more devices is determined as being higher in response to an increase in the sensitivity of the data a respective one of the one or more devices and in response to an increase in a vulnerability of the respective one of the one or more devices.

18. The system of claim 11, wherein the processing device is further to keep the one of the one or more devices on the respective current segment of the network if the one or more devices does not currently hold sensitive data, unless the previously stored data on the one of the one or more devices held sensitive data and is determined as vulnerable.

19. A non-transitory computer readable medium having instructions encoded thereon that, when executed by a processing device, cause the processing device to:
    determine data that is held on each of one or more devices that are connected to a respective current segment of a network;
    determine, by the processing device, a security risk of each of the one or more devices based at least on the data and sensitivity of previously stored data on the one or more devices; and
    in response to the security risk of one of the one or more devices satisfying a threshold, segment, by the processing device, the network such that the one of the one or more devices is placed on a less accessible segment than the respective current segment of the network, wherein being placed on the less accessible segment reduces the security risk of the one of the one or more devices.

20. The non-transitory computer readable medium of claim 19, wherein the security risk of each of the one or more devices is determined as being higher in response to an increase in the sensitivity of the data a respective one of the one or more devices and in response to an increase in a vulnerability of the respective one of the one or more devices.

* * * * *